Reissued Nov. 24, 1936

Re. 20,184

UNITED STATES PATENT OFFICE 20,184

LEATHERBOARD PRODUCT AND METHOD OF MAKING THE SAME

Herman William Richter, Bridgewater, Mass., assignor to Geo. O. Jenkins Co., Bridgewater, Mass., a corporation of Massachusetts No Drawing. Original No. 1,975,556, dated October 2, 1934, Serial No. 514,322, February 7, 1931. Application for reissue June 24, 1936, Serial No. 87,046

8 Claims. (Cl. 8—2)

This invention relates to the manufacture of heeling board, also known as leatherboard. As is well-known in the art, these two terms are used interchangeably to denote a material made from a furnish composed principally of leather scrap or waste (sole leather cuttings, skivings, etc.) by board making processes, which involve disintegration in a beating engine and subsequent formation into sheets or slabs on a wet machine. The product usually contains some paper (generally not over 15%) introduced for process purposes and to impart certain desirable characteristics to the material, together with more or less leatherboard scrap. In this specification the term "leatherboard" will be used to denote such a product without regard to the proportions of constituents, provided there is present sufficient leather to give it the desirable properties usually ascribed to the presence of leather fibre.

Unfortunately, leatherboard manufactured by the usual processes is of a rather dark, unattractive hue. This darkness is accentuated by the usual finishing operations, which involve the use of stains and dressings. If it were not for this serious shortcoming, leatherboard would be used in ever increasingly large quantities, wherever the valuable properties of leather are desired without its greater cost. As it is, the field of usefulness of leatherboard is limited to applications wherein a light, attractive color is not absolutely necessary. A large amount of the leatherboard manufactured is used in the shoe industry, particularly for the manufacture of heels, mid-soles, taps and innersoles.

By far the largest proportion of the leatherboard production goes into the manufacture of heels. While it is not essential that the heels match the shoes in all cases, it is, nevertheless, highly desirable from the standpoint of the heel manufacturer that a leatherboard of lighter color be produced since such a board would make possible the production of heels simulating those made from hide leather when finished in the "natural" shade.

The dark, unattractive color is undoubtedly due to the presence of iron-tannate inks formed in the leatherboard during its fabrication by chemical reaction between the tannins present in the leather scrap and the iron of the fabricating apparatus. Various attempts have been made to produce a light colored leatherboard, but since dyes were usually used in an effort to overcome the dark coloration, these attempts did not meet with success. A light colored piece of goods may be dyed to darker shades, but obviously it is impossible to lighten a dark piece of goods by the use of dyes.

It is only by preventing the formation of the inks in the product in the first instance, or by removing them from the texture of the material after its manufacture, that it would be possible to liberate the true color of the leather and obtain effects such as have hitherto only been obtainable with genuine hide leather. To accomplish either of these results without at the same time injuring the leather fibre, has prior to the present invention been impossible.

The general object of the present invention is to produce a leatherboard having the true color of the leather fibre and without the tendency to darken on being treated with the usual stains and dressings.

A further object is to produce such a product without the use of expensive materials or complicated apparatus and without injuriously affecting the leather fibre.

The invention depends upon the fact that the iron-tannate inks or "saddening material" can be totally destroyed or removed by the application of very dilute solutions of bleaching agents, so as to liberate the natural color of the leather fibre, without injuriously affecting its durability or other desirable properties. Among the large number of bleaching agents that can be used for this purpose may be mentioned ordinary bleaching solutions such as bisulphites, various acids, as sulphurous, oxalic and sulphuric acid, and even the so-called syntans such as those described by Stiasny in his United States Patent No. 1,237,405 and his British Patents Nos. 8,511 and 8,512 of 1912. All members of this class of bleaching agents are acid, non-oxidizing agents, and they fall into two subclasses namely acid reducing agents and acid neutral agents. Sulphuric acid and the syntans are members of the latter subclass since they are neither oxidizing nor reducing agents.

The bleaching agent can be applied to the furnish or to the leatherboard product in any of the following ways:—in the beater, in the vat, by spraying, or by simple dipping of the leatherboard in the form of sheets or slabs in a dilute solution of the bleaching agent.

I prefer to dip the sheet of leatherboard into a solution of oxalic acid of between 1 and 4% concentration. A 3% concentration appears to give the most desirable result—a pale-colored product that takes the usual light stains and dressings without the undesirable darkening or discoloration so characteristic of untreated leatherboard. A 2% solution does not produce so pale a board and a 4% concentration throws the shade more on the reddish side, which is not as desirable as a pale color.

The time for complete penetration of the board varies nearly proportionally to the thickness of the board. It also varies with the density of the board. A simple method is to allow the board to remain in the solution until complete penetration is effected. This can be determined by separation tests or by not removing the board until it is certain that the solution has struck through.

A test run can be made on a sample taken from a lot of board to be treated in order to determine the time necessary to produce the desired effect on the rest of the lot. Another way would be to consult a graph showing the relationship between density and the time necessary for the desired degree of penetration for a particular thickness of board. Such graphs can be easily prepared in advance covering a large range of densities and thicknesses.

By arresting the process before complete penetration is obtained, it is possible to produce various desirable results. For example, by a quick dipping, between 30 seconds and five minutes for boards of low density, or longer periods of time for boards of high density, it is possible to simulate the difference in shade which can be observed between the grain surface and the center of any cut section of hide leather.

A light pale leatherboard produced by my method will not be darkened to anything like the same extent as leatherboard produced by prior art methods on being treated with the usual stains and dressings employed in heel finishing. Thus, it is possible to produce variegated effects in heels and other articles by laminating layers of differently colored or tinted leatherboard. Some of the layers may be of pure hide leather or of untreated leatherboard to secure desired effects. It is to be understood that my invention is not dependent upon any explanations or theories which I have set forth as descriptive of the actions involved, nor dependent upon the soundness or accuracy of any theoretical statements so advanced, but is limited solely by the following claims, which are made a part of this application, and in which I intend to claim all novelty inherent in my invention which is permissible in view of the prior art.

I claim:

1. The method of treating leatherboard, which has been made by conventional methods, so as to liberate the natural color of the leather fibre which was obscured by the iron-tannate inks formed in the leatherboard during its fabrication by chemical reaction between the tannins present in the leather scrap and the iron of the fabricating apparatus, which method consists in subjecting the leatherboard to the bleaching action of an acid reducing agent of sufficient concentration to produce the desired effect but of insufficient concentration to injure the fibre of the leatherboard.

2. The method as defined in claim 1, wherein the reducing agent is oxalic acid.

3. The method as defined in claim 1, wherein the reducing agent is oxalic acid and the solution has a concentration of from 1 to 4%.

4. The method as defined in claim 1, wherein the leatherboard is dipped into the solution of reducing agent, which solution contains oxalic acid of about 3% concentration.

5. The method of making a sheet of leatherboard having substantially the same difference in shade between its grain surface and center as has a cut section of hide leather, which method consists in subjecting a sheet of leatherboard which has been made by conventional methods and which contains iron-tannate inks to the bleaching action of an acid reducing agent for a period of time insufficient to permit complete penetration of the acid reducing agent.

6. The method of treating leatherboard, which has been made by conventional methods, so as to liberate the natural color of the leather fibre which was obscured by the iron-tannate inks formed in the leatherboard during its fabrication by chemical reaction between the tannins present in the leather scrap and the iron of the fabricating apparatus, which method consists in subjecting the leatherboard to the bleaching action of an acid non-oxidizing agent of sufficient concentration to produce the desired effect but of insufficient concentration to injure the fibre of the leatherboard.

7. The method of treating leatherboard, which has been made by conventional methods, so as to liberate the natural color of the leather fibre which was obscured by the iron-tannate inks formed in the leatherboard during its fabrication by chemical reaction between the tannins present in the leather scrap and the iron of the fabricating apparatus, which method consists in subjecting the leatherboard to the bleaching action of an acid neutral agent of sufficient concentration to produce the desired effect but of insufficient concentration to injure the fibre of the leatherboard.

8. The method as defined in claim 7 wherein the acid neutral agent is sulphuric acid.

HERMAN WILLIAM RICHTER.